United States Patent
Tittizer et al.

(10) Patent No.: US 8,418,130 B2
(45) Date of Patent: Apr. 9, 2013

(54) MANAGING COMMENTS ASSOCIATED WITH COMPUTER CODE

(75) Inventors: Abigail A. Tittizer, Austin, TX (US); Venkatesan Ramamoorthy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 12/130,830

(22) Filed: May 30, 2008

(65) Prior Publication Data
US 2008/0228762 A1 Sep. 18, 2008

Related U.S. Application Data

(63) Continuation of application No. 11/379,390, filed on Apr. 20, 2006, now abandoned.

(51) Int. Cl.
*G06F 9/44* (2006.01)

(52) U.S. Cl.
USPC ........... 717/109; 717/106; 717/107; 717/108; 717/110

(58) Field of Classification Search .................. 717/109, 717/106–108, 110
See application file for complete search history.

(56) References Cited

U.S. PATENT DOCUMENTS

| | | |
|---|---|---|
| 5,574,837 A | 11/1996 | Clark et al. |
| 6,106,571 A | 8/2000 | Maxwell |
| 6,269,474 B1 | 7/2001 | Price |
| 6,467,081 B2 | 10/2002 | Vaidyanathan et al. |
| 6,502,233 B1 | 12/2002 | Vaidyanathan et al. |
| 6,556,218 B1 | 4/2003 | Alcorn |
| 6,668,255 B2 | 12/2003 | Mielenhausen |
| 6,698,013 B1 | 2/2004 | Bertero et al. |
| 6,704,730 B2 | 3/2004 | Moulton et al. |
| 6,757,893 B1 | 6/2004 | Haikin |
| 6,851,105 B1 | 2/2005 | Coad et al. |
| 6,964,036 B2 | 11/2005 | Bates et al. |
| 6,993,013 B1 | 1/2006 | Boyd |
| 6,993,487 B2 | 1/2006 | Bluvband |
| 7,103,885 B2 | 9/2006 | Foster |
| 7,114,149 B2 | 9/2006 | Aptus et al. |
| 7,222,333 B1 * | 5/2007 | Mor et al. ..................... 717/115 |

(Continued)

FOREIGN PATENT DOCUMENTS

EP 0567722 A2 11/1993

OTHER PUBLICATIONS

Long, P. "C# Commenting", 2002, Charterls, p. 1-10.*

(Continued)

*Primary Examiner* — Qamrun Nahar
(74) *Attorney, Agent, or Firm* — Jason H. Sosa; Mark C. Vallone; Schubert Osterrieder & Nickelson PLLC

(57) ABSTRACT

Methods and arrangements to manage comment data that is associated with computer executable code are provided. Comment data associated with a line or lines of executable code can be stored, and a tag can be assigned to the comment, data or the line(s) of code. When it is desired to locate, information about lines of code, tags allow for an improved way to search for the desired lines of code. Thus, in response to a user query for information, a search engine can locate a specific tag or groups of tags and display code and comments associated with the located tag(s).

20 Claims, 4 Drawing Sheets

U.S. PATENT DOCUMENTS

| | | | |
|---|---|---|---|
| 7,225,157 | B2 | 5/2007 | Howard et al. |
| 7,321,988 | B2 | 1/2008 | Guo et al. |
| 7,401,031 | B2 | 7/2008 | Hughes |
| 7,412,699 | B2 | 8/2008 | Francis et al. |
| 7,454,744 | B2 | 11/2008 | Bhogal et al. |
| 7,461,368 | B2 | 12/2008 | White |
| 7,496,906 | B2 | 2/2009 | Black-Ziegelbein et al. |
| 7,500,221 | B2 | 3/2009 | Baumann |
| 7,500,222 | B2 | 3/2009 | Bates et al. |
| 7,519,621 | B2 | 4/2009 | Harik |
| 7,526,753 | B2 | 4/2009 | Spencer et al. |
| 7,542,958 | B1 | 6/2009 | Warren et al. |
| 7,568,109 | B2 | 7/2009 | Powell, Jr. et al. |
| 7,627,851 | B2 | 12/2009 | Lotter |
| 7,665,061 | B2 | 2/2010 | Kothari et al. |
| 7,721,253 | B2 | 5/2010 | Tatsumi et al. |
| 7,934,205 | B2 | 4/2011 | Bera |
| 2001/0042045 | A1 | 11/2001 | Howard et al. |
| 2002/0029231 | A1 | 3/2002 | Aptus et al. |
| 2002/0095657 | A1 | 7/2002 | Vaidyanathan et al. |
| 2003/0221186 | A1 | 11/2003 | Bates et al. |
| 2004/0261059 | A1 | 12/2004 | Spencer et al. |
| 2005/0005258 | A1 | 1/2005 | Bhogal et al. |
| 2005/0108686 | A1 | 5/2005 | White |
| 2005/0166193 | A1 | 7/2005 | Smith et al. |
| 2005/0229156 | A1 | 10/2005 | Baumann |
| 2005/0235247 | A1 | 10/2005 | Francis et al. |
| 2005/0251536 | A1 | 11/2005 | Harik |
| 2005/0262056 | A1 | 11/2005 | Hamzy et al. |
| 2006/0015856 | A1 | 1/2006 | Lotter |
| 2006/0218523 | A1 | 9/2006 | Tatsumi et al. |
| 2007/0006152 | A1 | 1/2007 | Ahmed et al. |
| 2007/0180455 | A1 | 8/2007 | Mariani |
| 2007/0299825 | A1* | 12/2007 | Rush et al. ............... 707/3 |
| 2009/0222429 | A1 | 9/2009 | Aizenbud-Reshef et al. |
| 2010/0333079 | A1 | 12/2010 | Sverdlov et al. |
| 2011/0010353 | A1 | 1/2011 | Wei et al. |

OTHER PUBLICATIONS

Hui, et al. "The Hardware Probe Connection Research of CodeTEST Based on ARM", 2010, IFITA, p. 333-335.*

Chen et al, "CVSSearch: Searching Through Source Code Using CVS Comments." Proceedings of IEEE International Conference on Software Maintenance, pp. 364-373, Nov. 7-9, 2001.

Non Final Office Action for U.S. Appl. No. 11/379,390, dated Nov. 20, 2009.

Response to Non Final Office Action for U.S. Appl. No. 11/379,390, dated Feb. 22, 2010, filed Feb. 22, 2010.

Supplemental Response to Non Final Office Action for U.S. Appl. No. 11/379,390, dated Apr. 19, 2010, filed Apr. 19, 2010.

Final Office Action for U.S. Appl. No. 11/379,390, dated May 26, 2010.

Non Final Office Action for U.S. Appl. No. 12/826,979, dated Mar. 1, 2012.

Response to Non Final Office Action for U.S. Appl. No. 12/826,979, dated May 29, 2012, filed May 29, 2012.

* cited by examiner

MANAGING COMMENTS ASSOCIATED WITH COMPUTER CODE

CROSS-REFERENCES TO RELATED APPLICATIONS

Pursuant to 35 USC §120, this continuation application claims priority to and benefit of U.S. patent application Ser. No. 11/379,390, entitled "Systems and Methods for Managing Data Associated with Computer Code", filed on Apr. 20, 2006, the disclosure of which is incorporated herein in its entirety for all purposes.

FIELD

The present disclosure relates to the field of computers and more particularly, to methods and arrangements for managing data associated with lines of code in a computer program.

BACKGROUND

The popularity of computers continues to grow. In fact, computers have become very important tools for many individuals and man y businesses throughout the world. One reason for such a proliferation in computer usage, is that computers can efficiently perform many tasks that heretofore were performed manually by humans with a pencil and paper. For example, adding numbers, writing papers, tracking inventory, tracking important dates, and sending mail, can be preformed more efficiently with the assistance of a computer.

However, each task requires a computer to execute at least one set of instructions. Accordingly, a significant amount of computer executable instructions are commercially available to the public. These executable instructions are referred to by many names including computer programs, computer code, program code, computer software, computer instructions, applications, or simply "code." Typical computer programs are relatively complex and it is difficult to understand how code manipulates a processor of a computer during every step of a process. Often, millions of hours are spent creating and improving such programs and a typical computer program has thousands of lines of code.

Most computer programs have an initial release or publication. Later, when improvements are added to existing programs, a new version of the computer program is released. It is also rare for a new program to be developed from "scratch" as programmers that develop new programs often borrow code from textbooks, templates or from some previously developed code. A typical computer program will have numerous releases wherein each new release will provide an incremental improvement to the previously released version. New software generally must be compatible with previously released software; thus, large pieces of code in a software release are often borrowed from the previously released version of the software.

Often, when a computer program needs improvements, new programmers are assigned the task, but the new programmers are often unfamiliar with the intricacies of the existing program. Additionally, when minor revisions are required to existing code, novice programmers are often employed to make such revisions. One major challenge that programmers face is to understand how specific functions within the existing software occur and when and where these specific functions occur. It is nearly impossible for a programmer to improve or modify a program if the programmer cannot locate specific features of the code and understand how the code instructs the computer to perform. Further, knowing some history about the development of certain aspects of the code can help a programmer understand the current arrangement of the code in the computer program.

Computer programming tools typically allow programmers to add "comments" to lines of code during construction of the code wherein the comments can provide a "narration" of the code and log important details. Such a narration can make it easier for subsequent programmers to locate and understand features within the code. Generally, a programmer can add comments at a "source code" level, or integrate comments into the source code. Source code is a machine readable language level that can instruct a processor of a computer to execute specific functions.

As stated above, comments can provide data that explains something about a line of code, or about a block of code, and comments are often added by a programmer in an effort to make the code more understandable for subsequent programmers. For example, a comment can locate a start of a functional feature in the program, can explain the feature provided by lines of code, can explain why the feature was added and can locate an end to a section of code that provides the feature. When a programmer fixes a problem he or she may add additional comments regarding what was learned, how an improvement was made, why a line of code was added or modified and what problems were fixed by the added line(s) of code.

Like many other sciences, programming has its own technical language and "slang" often becomes accepted terminology as the language evolves for the particular science. Although comments can be written in "plain English" to "educate" subsequent programmers, many programmers write in less than perfect English and programmers often utilize technical jargon in the comments. Thus, comments are often non-uniform and hard to search with a text search, making sections of code hard to locate and hard to understand.

Typically, during the programming procedure, source code is displayed to a user by a programming tool and comments can be added adjacent to lines of code. Specific syntax in the displayed program can separate or delineate the comments from executable code. Generally, comments are intended to assist programmers in understanding something about the code and when a computer executes the code, the computer will ignore the comments that are integrated with the code.

Software development tools have been significantly improved in recent years and many development tools now provide what is called an integrated development environment or (IDE). The concept of an IDE combines many tools that historically were separated entities. For example, an IDE can include a "browser type" graphical user interface, editors, compilers, auto-correction tools, and other very useful tools that can provide a single multifunctional software development tool. Some popular IDE's include Visual J++, VisualAge for C++ or Java, Java WorkShop, Visual Café, Elipse and IBM Websphere Studio Application Developer. Many programmers rely on the advantages provided by an IDE to develop code.

Although these commercially available IDEs provide many desirable features, IDEs still have many shortcomings. For example, IDEs and other development tools only provide limited management features for the voluminous, disorganized comments often found within source code. A "hodgepodge" of unusable programmer comments often occurs in code that has undergone many years of development from many different programmers and many different programming groups. Numerous authors with individual styles can cause serious non-uniformity in the comments because many programmers utilize their own abbreviations and jargon when making entries in the comments section. More specifically, lines of code that have been developed over the years and released numerous times often contain so many comments that it is hard for a programmer to locate the desired code.

Some development tools provide a simple text search tool to perform textual searches of the comments, but these tools are often useless when the comments include jargon and have a tenuous connection to the English language. In such a situation, creating search terms to initiate the text search is not an intuitive process. In fact in this situation, most programmers view the comments as useless clutter. Thus, in many circumstances the available tools cannot locate desired materials, and programmers often cannot make effective use of the comments in a computer program. Yet in mature code, comments can fill up a significant amount of space on a display, "obscuring" the actual computer executable code.

A programmer may have a specific question or want to find a specific function among the thousands of lines of code and thousands of comments. However, when comments lack any logical order, or are not coherent, the comments will have limited usefulness. These comments, however, may still be useful and salvageable if a proper comment data management tool were available to manage such data.

SUMMARY OF THE INVENTION

A method of managing comment data that is associated with lines of computer executable code is provided herein. Comment data can be linked to the executable code. The comment data can be stored, and a tag can be assigned to the comment data to further classify, describe or provide information about the comment data. When it is desired to locate a feature or something in the code, or in the comments, tags can allow for an improved way to search for such a feature. Thus, in response to a user query, a search engine can locate a specific tag or groups of related tags and display lines of code and comments associated with the located tag(s).

Such tags can provide descriptive attributes for lines of code and for the comments. For example, tags can indicate a time, a date, an action performed, an author, a revision number, a release number, an event, programmer contact information, a feature, a function, an important location in the code, a functional break in the code, past or present syntax or execution problems in the code, a defect, a person assigned to the defect, or a person assigned to a portion or line of code, to name a few.

The tags can be user defined and can be abbreviated such that a single character in the comments can provide a selectable link to additional information possibly stored in a database format. The tags can assist in classifying and indexing the comment data without taking up a significant amount of space on the display or creating "clutter" in the source code. In other embodiments, instead of an abbreviation, a tag can be a descriptive word. When the tag provides a selectable link, the tag can act as a selectable button, and when the selectable button is selected by a user, additional data can be retrieved from a database and displayed to provide more in-depth, often useful data to the user.

Such a data management method allows voluminous, unorganized and even cryptic comment data integrated with source code to be easily managed such that the comment data can be organized to provide meaningful information to an unfamiliar programmer or IDE user. The results of a search for tags can be displayed as lines of computer readable code and comment(s) with tags that are associated with the lines of code.

To create the tagged code or comments, a programmer can manually enter tags to comments or the code. In one embodiment, the IDE or software development platform can automatically add tags to lines of computer readable code responsive to the results of a specific user action. For example, when a user modifies a line of code, the dates, actions, names, revision numbers, and their associated tags can be automatically entered into the comments by the IDE. In another embodiment an IDE can automatically add tags to comments associated with the code. For example, responsive to the process of compiling or linking, an ancillary process that monitors activities performed by the computer can auto-assign tags to the comment data.

Comment data entry can also be performed with the assistance of a graphical user interface. In such an embodiment, a pop-up window can be provided by the software development platform such that a programmer can select/assign a tag to a comment after viewing a list of tags in a menu. A logical association can be created between tags, such as between a date, an author, a release and a revision number. Such an association can be utilized to index data and form a relational database. Multiple tags can be assigned to a single line of code or to a single comment data entry.

When a programmer desires to locate code or comments, the user can activate a "search pop-up window" and choose from a list of searchable tags or a combination of searchable tags and search criteria. For example, multiple search criteria can be utilized to provide an advanced multiple criteria search for lines of codes or comments.

In another embodiment, an apparatus is provided to manage comment data. An association module can associate executable computer instructions with comment data. The comment data can provide searchable attributes for the comment data. A tagger can be connected to the association module and the tagger can tag the attributes so that the attributes can be classified and then effectively located during future searches. The embodiment can also include a search engine to locate the executable computer instructions utilizing the attributes in response to a user query. In addition, a graphical user interface can be provided that is adapted to receive user input, display user selectable buttons and to display search results. The apparatus can also be integrated with other software development tools.

In another embodiment, a machine-accessible medium containing instructions to manage comment data associated with computer executable code is provided. The medium can instruct a computer to store at least one line of computer executable code, tags and comment data in an integrated program development application. The comment data can be associated with the tag and the at least one line of computer executable code. The comment data can provide information for, or describe an attribute of the line of computer executable code. A tag from a group of tags can be assigned to the comment data. Responsive to a search, tags can be located and search results can be provided to the user.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of embodiments of the disclosure depicted in the accompanying drawings. The embodiments are in such detail as to clearly communicate the disclosure. However, the amount of detail offered is not intended to limit the anticipated variations of embodiments, but on the contrary, the intention is to cover all modifications, equivalents, and alternatives falling within the spirit and scope of the present disclosure as defined by the appended claims. The detailed descriptions below are designed to make such embodiments obvious to a person of ordinary skill in the art.

Generally speaking, methods and arrangements to manage comments to executable computer code with a software development tool are provided. Embodiments include transformations, code, state machines or other logic to sort and display comments within a software development platform. While specific embodiments will be described below with reference to a particular database, development tools, or logic configurations, those of skill in the art will realize that embodiments of the present disclosure may advantageously be implemented with other substantially equivalent configurations.

Generally, when a programmer is given a task of writing or modifying a computer program, he or she will utilize a software development tool. Historically, different software development tools were utilized during different steps of the development process. Recently, these tools have been integrated to create an integrated, development environment (IDE). One feature that has been traditionally provided with software development tools is the ability to integrate comments with computer executable code, commonly referred to as just "code."

Comments allow a programmer, to "annotate" or narrate each line of code or sections of code to assist subsequent programmers in understanding the executable code. However, comments often become unusable and there is no effective way to sort through the thousands of lines of code and comments to find relevant information.

In accordance with the present disclosure, a line of computer executable code, comments associated with the line of code and a tag can be stored utilizing an integrated program development tool. The code comment data can contain information about a line or lines of code and can describe an attribute of the line(s) of computer executable code. At least one tag from the plurality of tags can be associated with the code comment data and the line of computer executable code. The code comment data can also be linked to, or associated with, the line of computer executable code. In response to a user query that can utilize one or more tags, search results can be located that are consistent with the user query. The search results can be provided as a list of selectable results wherein selecting a link in the displayed selectable results can retrieve additional information.

Figure 1:
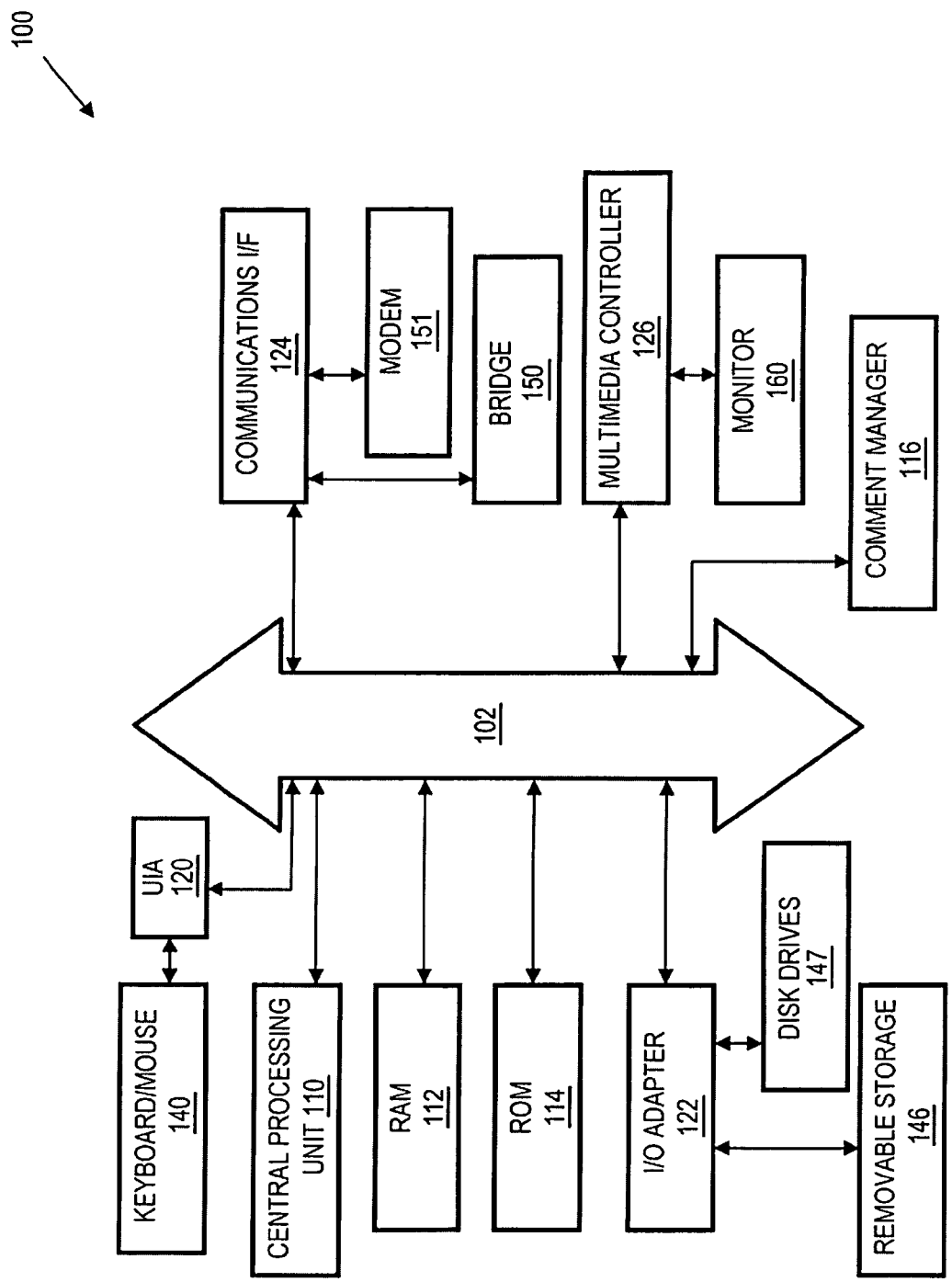
FIG. 1 depicts a computer system that could be utilized to manage comment data in an integrated computer code development environment.

Turning now to the drawings, FIG. 1 illustrates, in a block diagram format, a processing device such as a personal computer system 100. The personal computing system 100 could be utilized to operate an integrated development environment (IDE). Such an environment could execute an entire suite of computer programs that can assist a programmer in developing computer software. Although a personal computer platform that can be networked is described herein, workstations and a mainframe platform or other operating systems, environments or platforms would not part from the scope of the disclosure.

The computer system 100 is illustrated to include a central processing unit 110, which may be a conventional proprietary data processor, memory, including random access memory 112, read only memory 114, and input/output adapter 122, a user interface adapter 120, a communications interface adapter 124, and a multimedia controller 126.

The input/output (I/O) adapter 122 can be connected to, and control, disk drives 147, and removable storage devices 146, as well as other standard and proprietary I/O devices such as a printer (not shown). The user interface adapter 120 can be considered to be a specialized I/0 adapter. The adapter 120 as illustrated is connected to a mouse, and keyboard 140. In addition, the user interface adapter 120 may be connected to other devices capable of providing various types of user control, such as touch screen devices, track balls etc. (not shown).

The communications interface adapter 124 can be connected to a bridge 150 such as is associated with a local or a wide area network, and a modem 151. By connecting the system bus 102 to various communication devices, external access to information on a network can be achieved. The multimedia controller 126 will generally include a video graphics controller capable of displaying images upon the monitor 160, as well as providing audio to external components (not illustrated).

A comment manager module 116 can be connected to system bus 102 and can provide logic or instructions to facilitate management of tags and comments associated with computer executable code. Generally, the methods described herein can be executed by, or provided by, the computer system 100. Central processing unit 110 can execute functions and provide useful tools to a programmer during the development of a computer program. One of the more specialized tools and operations that the system 100 can provide is management of comment data, possibly tagging comment data and searching for comment data. Thus, a system such as system 100 could be utilized to execute the method described herein.

Figure 2:
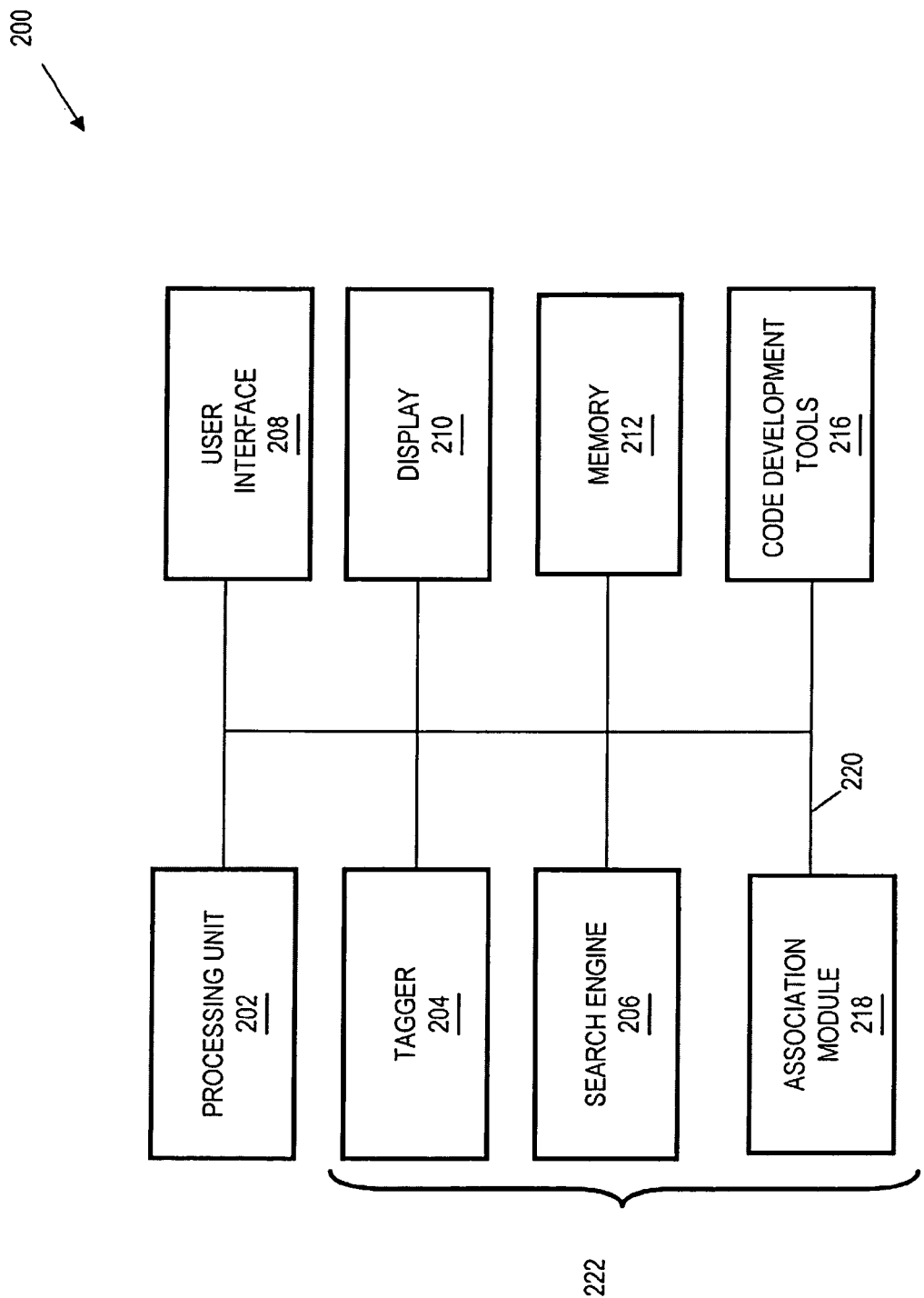
FIG. 2 illustrates a block diagram of an apparatus that can manage comment data.

FIG. 2 depicts a block diagram of an embodiment of a computer system 200 that includes comment manager components 222. The comment manager components 222 can function the same as, or similar to the comment manager 116 illustrated in FIG. 1. The computer system 200 can include a processing unit 202, memory 212, code development tools 216, a user interface 208, possibly embodied as a graphical user interface, and a display 210. The code development tools 216 can be a suite of software development tools commonly bundled to form an integrated development environment. The comment manager components 222 can include a tagger 204, a search engine 206, and an association module 218. In accordance with the present disclosure, all of the abovementioned components can be interconnected with a system bus 220.

Generally, during a programming procedure a programmer will enter computer executable code and, at the appropriate time, a programmer can enter comments to describe features or attributes of the computer executable code. Association module 218 can associate the executable computer code with the comment data. In one embodiment, the comment data can be stored in a file that is separate from a file that stores the executable code. In this configuration the comment data can be linked to the executable code such that when a programmer requests to view comments, the comment data can be inserted into the computer code when displayed.

In operation, the graphical user interface 208 can be displayed on the display 210; and a user, such as a programmer, can utilize the code development tools 216 to create or develop computer executable code. When the user adds comments to the code, the association module 218 can associate the comments with lines of the executable code. In addition the tagger 204 can facilitate manual or automatic tagging of the comments in the code. Generally, the tags can identify attributes of the comments or provide classifications or additional information for the comments and the code such that the attributes within the code and the comments can be efficiently located during a search for information via tags by the search engine 206.

The association module 218 can also provide an indexing feature. The association module 218 can facilitate the process of converting the collection of comment data, tags and code into a relational database such that the search engine 206 can locate relevant comment data with a simple search. The search engine 206 can also facilitate advanced search tools that are menu driven via the user interface 208.

When a user desires to search for tags, comments or computer code the user can manipulate selectable buttons on the user interface 208. The results of such searches or selections can be displayed on display 210 via the user interface 208. A list of assignable and searchable tags can also be displayed oil the display 210. To initiate a search for tags or for comments associated with tags, the user can select tags that are displayed as selectable links or selectable buttons on the display 210. Such a user selection/action can facilitate the retrieval and display of large sections of code, tags, comments, definitions and other supporting data. In one embodiment, a user query can be made that includes multiple search criteria such as a search for multiple tags associated with the comment data. For example, a search for an author, a date and a revision number can be made simultaneously to narrow or focus a search such that the search finds relevant code or comments.

In yet another embodiment, the computer can conduct a process on computer executable code (such as compiling) and the tagger 204 can automatically add tags to the computer executable code responsive to the results of such a process. Tags can also be assigned manually by a user utilizing the user interface 208. The components of the comment manager apparatus 200 can be implemented as hardware, software, or a hybrid thereof.

Figure 3:
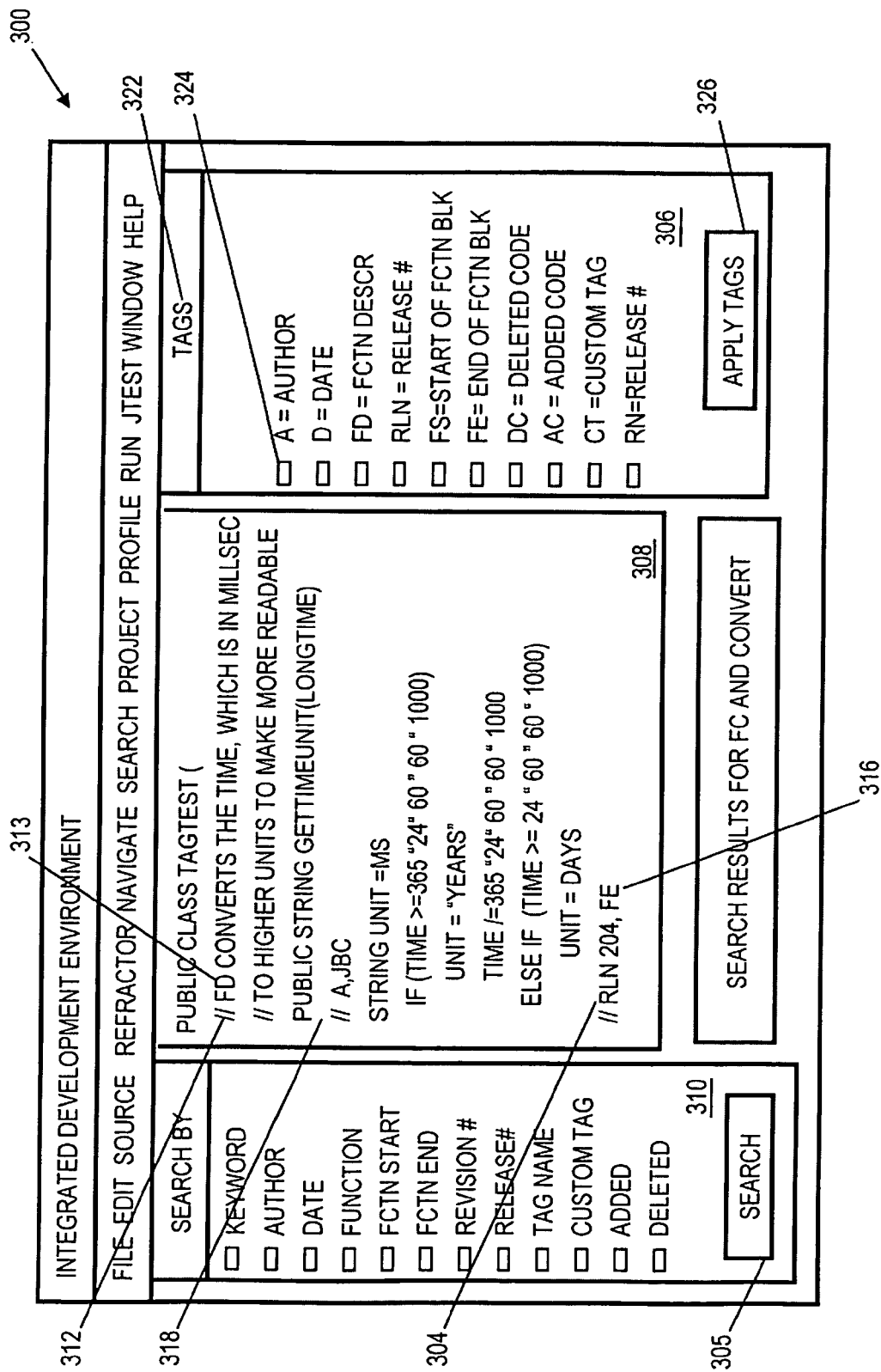
FIG. 3 depicts an embodiment of a graphical user interface of a comment management system in a programming environment.

FIG. 3 depicts an embodiment of a graphical user interface (GUI) 300 that can be utilized to develop lines of code and can be utilized to enter comments and tags for the lines of code. The GUI 300 can also provide comment data management capabilities including facilitation of comment tagging and comment searching. GUI 300 can have a search sub-window 310, a tag sub-window 306, and a program code sub-window 308. Generally, a comment searching function can be facilitated by the search sub-window 310, a comment tagging function can be facilitated by the tag sub-window 306 and programming can be facilitated by the program code sub-window 308.

As with many graphical user interfaces, the programmer can activate a sub-window such as search sub-window 310 and tag sub-window 306 by placing a cursor on a menu-bar and clicking a mouse button to activate such a window or sub-window. Once a sub-window, such as program code sub-window 308, is displayed or "popped-up", a user can select a feature facilitated by the sub-window or activate a function facilitated by the sub-window. For example, if the user wants to write code, he or she would place the cursor in the program code sub-window 308 and begin programming by entering code. Program languages such as C, C++ and Java, to name a few, each have their own syntax which is analogous to the precision grammar requirements present in different languages. The GUI 300 illustrated provides a Java programming environment and the lines of code in the program code sub-window 308 provide a small section of code of an entire computer program that could be executed by a processor of a computer. Such a programming environment is merely an example, as nearly any programming language and nearly all programming tools could utilize the teachings provided herein.

In a Java environment, two back slashes 312 are entered as the first characters on a line in the code section to indicate or delineate a comment. Thus, the computer executing the code will ignore the characters that follow the two back slashes 312. Accordingly, the text starting with, "Converts the time which is in millisec . . . " is a comment provided by a programmer to explain the subsequent section of code and tag "FD" 313 provides a searchable attribute for the comment wherein FD can be an abbreviation for "Functional Description." For example, a search such as "FD converts time" would efficiently locate the abovementioned comment.

Tags can be placed in areas of the program code sub-window 308 that are marked for comments. However, different ways to place or incorporate tags into the code would not part from the scope of the present disclosure. For example, different programming tools can abbreviate, locate and identify comments differently, possibly outside of the comments section without parting from the teachings of the present disclosure. Tags can indicate an attribute of a line of code, provide additional information about the code or further classify a comment for a line or lines of code. The tag selection sub-window 306 can be activated by selecting a selectable "tags" button 322 from a menu bar and when the tag selection sub-window 306 is pulled-down, a list of tags with selectable boxes can be displayed to a user. The user could also create custom tags and enter the custom tags into the menu of the tag selection sub-window 306 as desired.

When a user desires to add tags to comments or to portions of code the user could "check boxes," associated with an addable tag by placing a cursor in the box and depressing a mouse button. For example, placing a check or an "X" in box 324 would indicate that the user wants to place an "Author" tag in the comments section of program code sub-window 308. Such an operation would be considered a semi-automatic way to add tags to comments or code. After box 324 is checked and the cursor is placed in an appropriate location in the program code sub-window, the Apply button 326 could be activated to complete the tag assignment procedure.

Also, a default could be set such that the system automatically adds specific tags in certain circumstances. For example, a date and author tag entry could be automatically placed when a modification to the code is made by a particular author on a particular date. Auto-assigning could also occur based on a processing unit recognizing a keyword in a comment or in the computer executable code. For example, the keyword "converts" in the comments could activate an auto assignment of a FD tag, (i.e. functional description tag) by an IDE tool. Many other automated tagging features could also be provided.

The example illustrated utilizes abbreviations to indicate tags in the comments in an effort to minimize the space required on the screen to implement tags; however tags could be complete words or complete sentences. Tag sub-window 306 depicts possible abbreviations that can be utilized for tags.

In the program code sub-window 308 illustrated, tags FD 313, A 318, FE 316, and RLN 304 have been placed in the comments section. The tags 313, 318, 316, and 304 can be selected from the tag selection sub-window 306 and entered into a comments section of the program code sub-window 308 to identify various attributes of the lines of code or various attributes of comments. Portions of the comment proximate to the to may describe the attributes. More particularly, tag FD 312 can indicate that the text in the area proximate to the tag FD 312 includes a functional description for lines of code that perform a specific function. In the illustrated example, tag FD 313 indicates that a comment exists that locates lines of code that convert units of time.

Tag A 318 can indicate an author of a specific line of code. Proximate to the tag A 318 are the characters JBC, possibly indicating the initials of the author of the line of code. Additionally, contact information for the author or the person responsible for this section of code could be stored in a look-up table in memory. Thus, many different types of supporting information for the comments or tags could be stored in a relational database format and could be linked to the tags.

Tag RLN 304 provides that the illustrated line of code was released with release number 204 as indicated by the numbers subsequent to the tag RLN 304. As with the author example above, the indicator RLN 304 could also provide a selectable link wherein selecting the tag/link RLN 304 could display additional information or even additional links to the user.

When a user desires to place tags into the code or into the comments, tag window 306 can be activated and selectable buttons in the tag sub-window can allow a programmer to select tags for insertion into the comments. Thus the tag insertion/assignment process can be "semi-automatic." In one embodiment the tag insertion process could operate similar to the symbol insertion process provided by the Microsoft Windows Word® operating system. A few tags and abbreviations for tags are listed in the tag sub-window 306; however, many tags could be utilized. More specifically tags could provide information such as:

an indicator of when an event occurred such as a date the line of code was entered;
an indictor that a line of code was deleted or added;
an indicator that a portion of the code or a line of code was added or deleted;
an author who originated the code;
an author who modified the code;
a revision number;
a release number;
a release date;
an event;
a computer identifier indicating the computer that was utilized to modify the code;
a start or end of a group of code that performs a specific function;
contact information indicating who is or was responsible for maintaining the line of code;
an important location in the code;
a functional description of the code;
the location of further documentation, possibly an architecture or design document;
historical data about the function of the code (how it has been changed and why); and
a project number, project library or project package to name a few.

When it is desired to search the code or the comments, the search sub-window 310 can be activated or pulled down. Search sub-window 310 can also provide user selectable buttons such as "Author", "Date", "Function" etc. that allows a user to choose search criteria for searching comments and programming code.

In a particular embodiment, tags 313, 318, and 304 in the programming code sub-window 308 can act as selectable buttons or selectable links. Thus, selection of a tag in the programming code sub-window 308 could activate a pop-up window that allows for a text entry to narrow the search. For example, if search by "Author" has been selected, a pop-up window can appear that allows text to be entered that can, at least partially, represent a name. Responsive to this text entry, the search engine can search for text proximate to "Author tags" in the code or in the comments.

In addition, multiple search criteria can be selected in the search type sub-window 310 by checking multiple boxes in the search sub-window 310. Further, using a text entry window, (not shown) a user can enter text to be included in the search criteria. In another embodiment, comments could be entered under a project tag. Thus, a user could search for lines of code that are associated with a specific project library where the project may be assigned a title. For example, a project may be undertaken to add a feature to the code, and the additional changes and deletions related to the specific feature can be placed in a project library, such that a user can see what changes were made for a specific project by searching by a project tag.

After the desired search criteria are selected and entered by a user by placing checks in selection boxes, then a search button 305 can be selected to activate a search that will locate comment data associated with a text entry and selected tags. For example, an author, a date limitation, and a release number can be selected by a user to provide a narrow search for lines of code that have the specific combination of text and tags. It can be appreciated that a more advanced search can be conducted by defining the author search to look for the characters "Jo" in the author field and to look for revision dates between 2002 and 2003 in the revision field.

In one embodiment, the IDE can include executable features components such a compiler or a linker. When the IDE compiles the code, the IDE may auto-correct syntax errors in the newly compiled code. When the compiler corrects lines of code, the compiler may automatically insert tags in the code to identify where in the code the compiler has made changes or "auto-corrected" the code. Moreover, existing compilers would not have to be modified, as the IDE could utilize results of a compiling process to add tags to the compiled code based on the output provided by the compiler. In other embodiments, in response to specific processes, a tagger within the IDE can automatically insert tags without user intervention. For example, when a user types in a line of code, the IDE can automatically insert tags such as the date, time, editor, and a specific activity performed by the user.

Many other tags could be semi-automatically or automatically inserted into the code or into the comments by the IDE in response to user interaction or by a tool within the IDE. For example, a compiler could detect a defect, or a potential defect, in the code and place a number or other identifier in the code, assign a user who is responsible for the defect and send a notification to the assigned user. In one embodiment, when a user opens the IDE and the user has been assigned a defect, the user can be prompted or given the option to work on the defect and can be presented with the code that has the defect. The IDE could also allow different edit capabilities, such as a read only status for the comments, and could allow only the user who entered the comments to delete or modify existing comments. Each change in the code can have specific information embedded, for example, the author, the time and date and the defect number being addressed. In yet another embodiment, logical relationships, linking of data, or associations between tags can be created to form a relational database that contains tags and comments.

Figure 4:
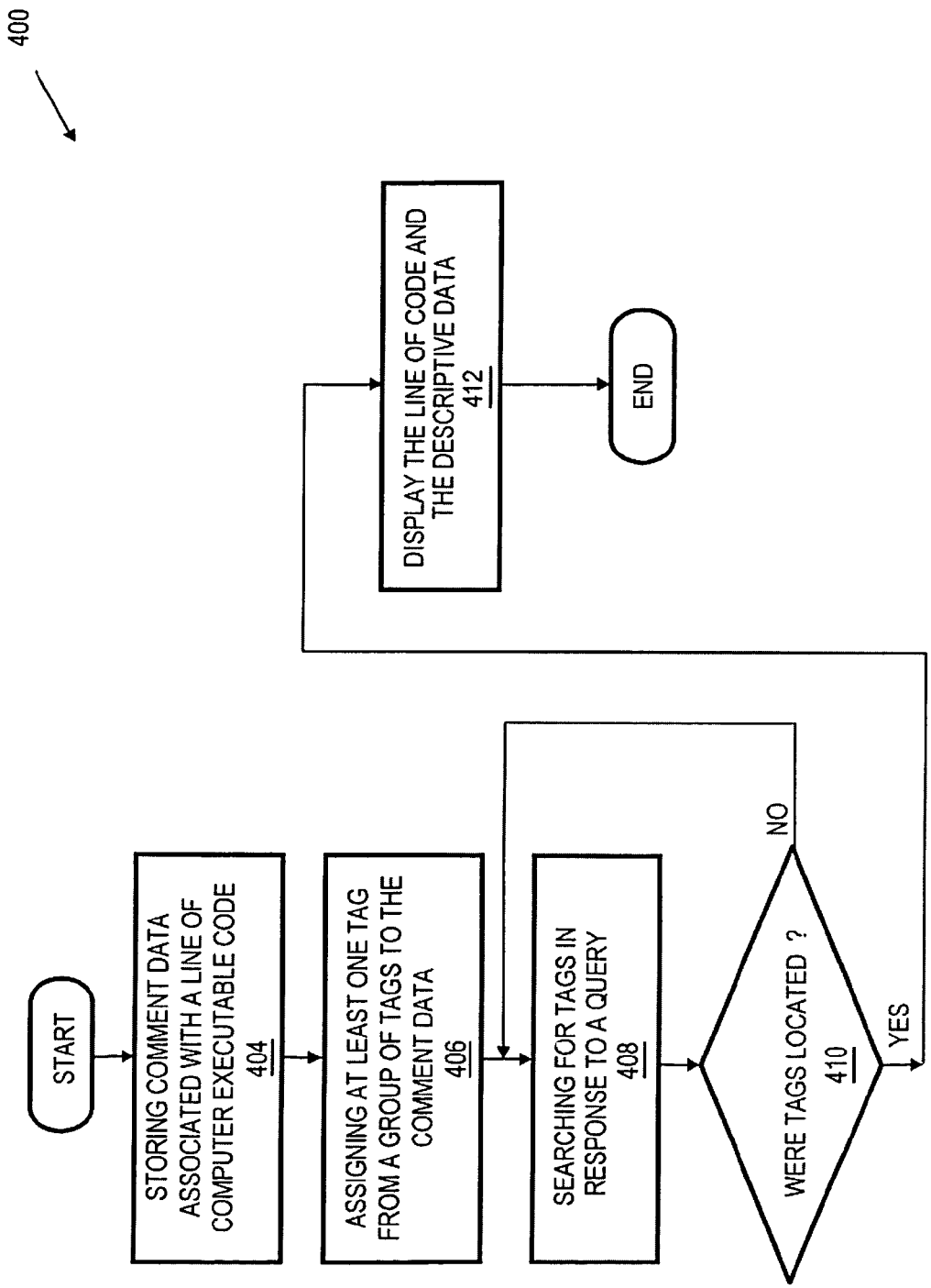
FIG. 4 illustrates a flowchart of an embodiment to manage comments in a software development system.

Referring now to FIG. 4, a flow diagram 400 that provides comment data management is provided. After the process starts, it can proceed to block 404 where, as illustrated, comment data, possibly descriptive data, associated with a line of computer readable code can be stored. As illustrated in block 406, at least one tag from a group of tags can be assigned to the comment data. As illustrated by block 408, a query can be created that facilitates a search. The search can be for one tag, multiple tags or for data associated with a tag. Such a search can locate and retrieve lines of code and comments that are consistent with the search criteria.

As illustrated by decision block 410, it can be determined if tags and code can be located responsive to the search. When no tags, comments or code can be located that are consistent with the search query, the process can revert back to block 408, where another query can be requested from the user. If tags, code, or comments are located in response to the query, the tags, code, or comments that are retrieved can be displayed as illustrated in block 412, and the process can end thereafter.

Another embodiment of the invention is implemented as a program product for implementing comment data management systems and methods described with reference to FIGS. 1-4. The program(s) of the program product defines functions of the embodiments (including the methods described herein) and can be contained on a variety of data bearing storage devices. Illustrative storage devices include, but are not limited to: (i) non-writable storage devices (e.g., read-only memory devices within a computer such as CD-ROM disks readable by a CD-ROM drive); and (ii) writable storage devices (e.g., floppy disks within a diskette drive or hard-disk drive). Such storage devices, when carrying computer-readable instructions that direct the functions of the present invention, represent embodiments of the present invention.

In general, the routines executed to implement the embodiments of the disclosure, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the disclosure should not be limited to use solely in any specific application identified and/or implied by such nomenclature.

It will be apparent to those skilled in the art having the benefit of this disclosure that the present invention contemplates methods and arrangements to manage comments in a software development environment. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for managing comments in an integrated programming development environment, the method comprising the steps of:

a computer receiving a location at which to insert a comment in a source code file containing a plurality of comments, the comment and the plurality of comments including text that is ignorable by a compiler or interpreter;

the computer displaying, on a user interface, a plurality of tags that can be inserted into the comment;

the computer receiving, through the user interface, a selection of a first tag from the plurality of tags;

the computer inserting the first tag into the comment;

the computer inserting the comment at the location, thereby including the comment in the plurality of comments;

the computer associating the comment with one or more lines of source code in the source code file based on the location;

the computer receiving a query, the query including a search term and a search tag:

responsive to receiving the query, the computer searching one or more comments associated with the search tag for the search term, the one or more comments being from the plurality of comments; and the computer determining that the first tag in the inserted comment matches the search tag and that the inserted comment includes text matching the search term, and in response, the computer displaying the first tag, at least a portion of the inserted comment, and at least a portion of the one or more lines of source code associated with the inserted comment.

2. The method of claim 1, wherein:

the query further includes a second search tag; and wherein the step of the computer searching one or more comments associated with the search tag comprises the computer searching one or more comments associated with the search tag and the second search tag.

3. The method of claim 1, further comprising the computer indexing the inserted comment in a database utilizing the first tag.

4. The method of claim 3, wherein the step of the computer searching the one or more comments associated with the search tag for the search term comprises:

the computer searching the database in which the inserted comment is indexed utilizing the first tag by determining whether an index of the database matches the search tag; and responsive to the index matching the search tag, determining if a comment associated with the index contains text matching the search term.

5. The method of claim 1, further comprising:

responsive to results from a build or compile process performed on one or more lines of source code, the computer inserting a tag indicative of one or more of the results into another comment, and associating the other comment with the one or more lines of source code that the build or compile process was performed on.

6. The method of claim 5, wherein at least one of the results of the build or compile process performed on one or more lines of source code comprises a detection of a possible error; and wherein the inserted tag indicative of one or more of the results, is indicative of the possible error.

7. The method of claim 1 wherein the step of the computer displaying the first tag, at least the portion of the inserted comment, and at least the portion of the one or more lines of source code associated with the inserted comment, comprises:

the computer displaying a selectable link; and the computer displaying additional data related to at least one of the first tag, the inserted comment, and the one or more lines of source code associated with the inserted comment in response to receiving a selection of the selectable links.

8. The method of claim 1, further comprising:

the computer inserting another tag into the inserted comment based on detected modifications to the one or more of lines source code associated with the inserted comment.

9. The method of claim 1, further comprising:

the computer insertiong another tag into the inserted comment based on recognition of a keyword within the inserted comment or the one or more lines of source code associated with the inserted comment.

10. The computer system of claim 1, wherein at least one of the results of the build or compile process performed on the one or more lines of source code comprises a detection of a possible error; and wherein the inserted tag indicative of one or more of the results, is indicative of the possible error.

11. A computer program product comprising one or more computer-readable tangible storage devices and computer-readable program instructions which are stored on the one or more storage devices and when executed by one or more processors perform the method of claim 1.

12. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

13. The method of claim 1, wherein the first tag provides a selectable link to a database storing information related to the inserted comment.

14. A computer system for managing comments in an integrated programming development environment, the computer system comprising:

one or more processors; and one or more computer-readable tangible storage devices;

program instructions, stored on at least one of the one or more storage devices for execution by at least one of the one or more processors, to receive a location at which to insert a comment in a source code file containing a plurality of comments, the comment and the plurality of comments including text that is ignorable by a compiler or interpreter;

program instructions, stored on at least one of the one or more storage devices for execution by at least one of the one or more processors, to display, on a user interface, a plurality of tags that can be inserted into the comment;

program instructions, stored on at least one of the one or more storage devices for execution by at least one of the one or more processors, to receive, through the user interface, a selection of a first tag from the plurality of tags;

program instructions, stored on at least one of the one or more storage devices for execution by at least one of the one or more processors, to insert the first tag into the comment;

program instructions, stored on at least one of the one or more storage devices for execution by at least one of the one or more processors, to insert the comment at the location, thereby including the comment in the plurality of comments;

program instructions, stored on at least one of the one or more storage devices for execution by at least one of the one or more processors, to associate the comment with one or more lines of source code in the source code file based on the location;

program instructions, stored on at least one of the one or more storage devices for execution by at least one of the one or more processors via at least one of the one or more memories, to receive a query, the query including a search term and a search tag;

program instructions, stored on at least one of the one or more storage devices for execution by at least one of the one or more processors, to search one or more comments associated with the search tag for the search term, the one or more comments being from the plurality of comments; and program instructions, stored on at least one of the one or more storage devices for execution by at least one of the one or more processors, to determine that the first tag in the inserted comment matches the search tag and that the inserted comment includes text matching the search term, and in response, display the first tag, at least a portion of the inserted comment, and at least a portion of the one or more lines of source code associated with the inserted comment.

15. The computer system of claim 14, further comprising program instructions, stored on at least one of the one or more storage devices for execution by at least one of the one or more processors, to, responsive to results from a build or compile process performed on one or more lines of source code, insert a tags indicative of one or more of the results into another comment, and associate the other comment with the one or more lines of source code the build or compile process was performed on.

16. The computer system of claim 14, wherein the first tag provides a selectable link to a database storing information related to the inserted comment.

17. A computer program product for managing comments in an integrated programming development environment, the computer program product comprising:

one or more computer-readable tangible storage devices;

program instructions, stored on at least one of the one or more storage devices, to receive a location at which to insert a comment in a source code file containing a plurality of comments, the comment and the plurality of comments including text that is ignorable by a compiler or interpreter;

program instructions, stored on at least one of the one or more storage devices, to display, on a user interface, a plurality of tags that can be inserted into the comment;

program instructions, stored on at least one of the one or more storage devices, to receive, through the user interface, a selection of a first tag from the plurality of tags;

program instructions, stored on at least one of the one or more storage devices, to insert the first tag into the comment;

program instructions, stored on at least one of the one or more storage devices, to insert the comment at the location, thereby including the comment in the plurality of comments;

program instructions, stored on at least one of the one or more storage devices, to associate the comment with one or more lines of source code in the source code file based on the location;

program instructions, stored on at least one of the one or more storage devices, to receive a query, the query including a search term and a search tag;

program instructions, stored on at least one of the one or more storage devices, to search one or more comments associated with the search tag for the search term, the one or more comments being from the plurality of comments; and program instructions, stored on at least one of the one or more storage devices, to determine that the first tag in the inserted comment matches the search tag and that the inserted comment includes text matching the search term, and in response, display the first tag, at least a portion of the inserted comment, and at least a portion of the one or more lines of source code associated with the inserted comment.

18. The computer program product claim 17, further comprising program instructions, stored on at least one of the one or more storage devices, to, responsive to results from a build or compile process performed on one or more lines of source code, insert a tag indicative of one or more of the results into another comment, and associate the other comment with the one or more lines of source code the build or compile process was performed on.

19. The computer program product of claim 17, wherein the -first tag inserted into the comment indicates that the comment is descriptive of one of: when a modification occurred, that a line of source code was deleted or added, an author who originated associated source code, an author who modified associated source code, a revision number, a release number, a release date, a computer identifier, a start or end of a function, contact information of an author, a functional description of associated source code, and a location of, or link to, further documentation.

20. The computer program product of claim 17, wherein the first tag provides a selectable link to a database storing information related to the inserted comment.

* * * * *